Feb. 18, 1930.     S. H. HOBSON     1,747,242
ELECTRIC STOVE
Filed Aug. 8, 1924     4 Sheets-Sheet 1
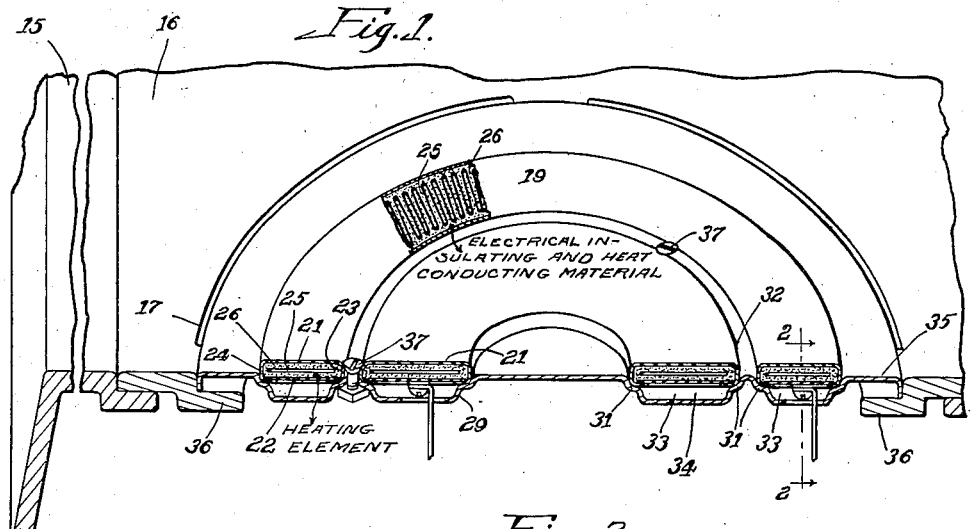
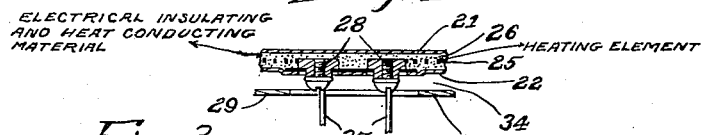
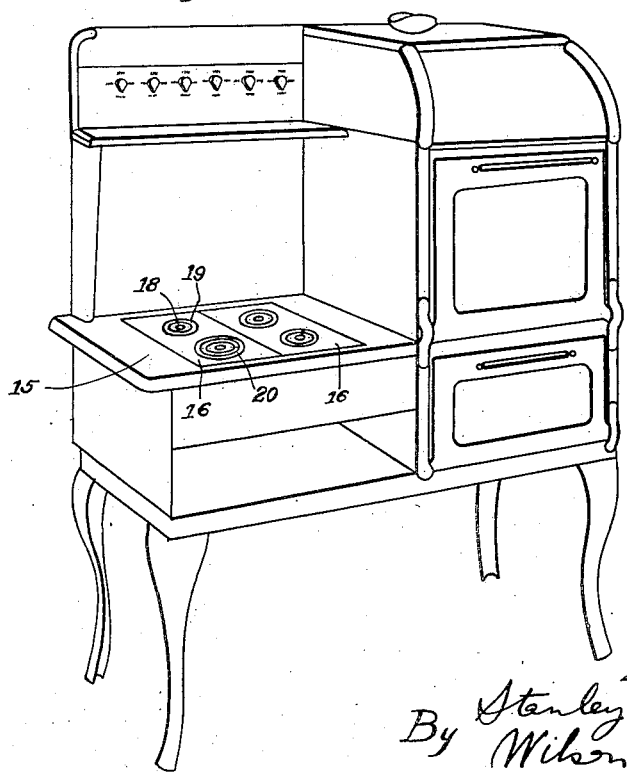
Inventor:
Stanley H. Hobson
By Wilson & McGuire
Attys.

Feb. 18, 1930.  S. H. HOBSON  1,747,242
ELECTRIC STOVE
Filed Aug. 8, 1924   4 Sheets-Sheet 2
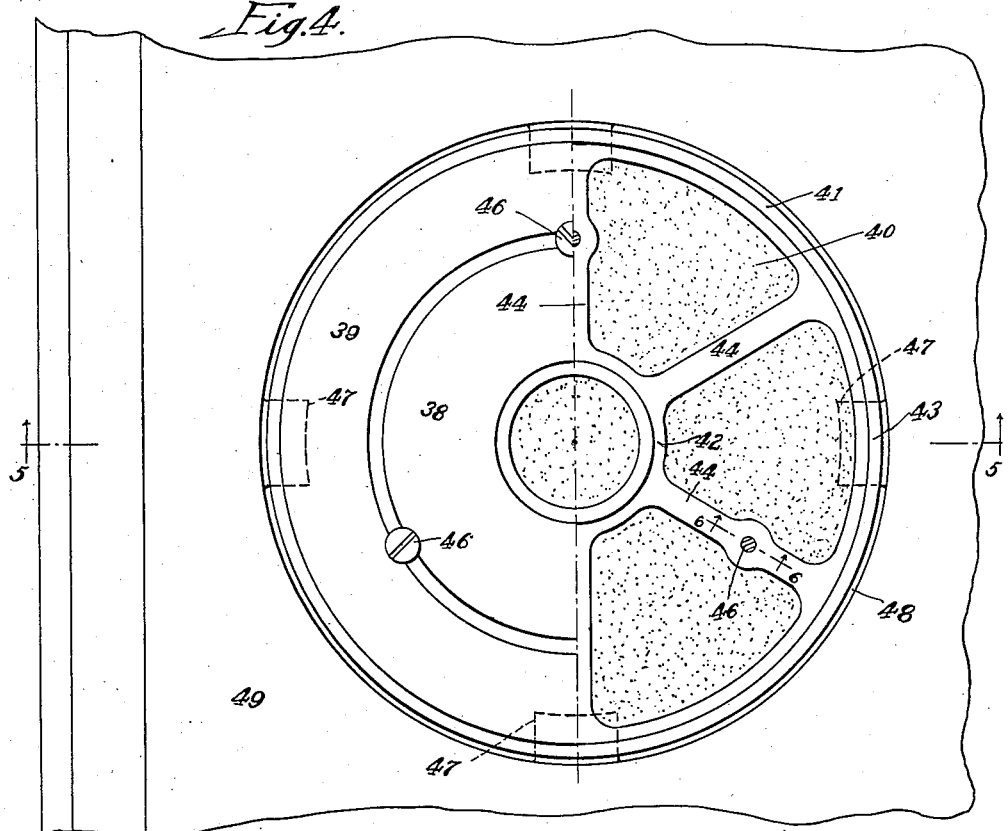
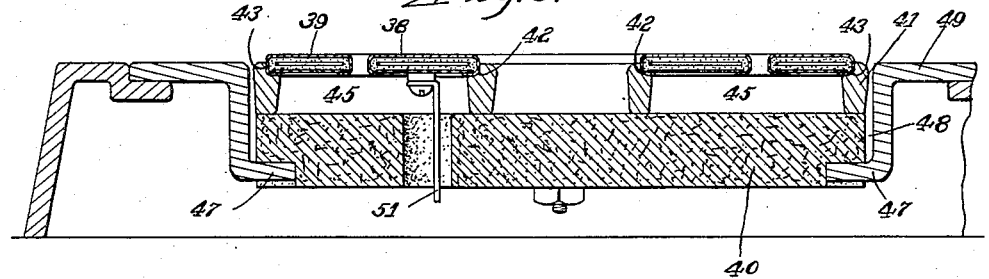
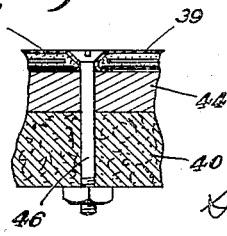
Inventor:
Stanley H. Hobson
By Wilson & McCanna
Attys Feb. 18, 1930.   S. H. HOBSON   1,747,242
ELECTRIC STOVE
Filed Aug. 8, 1924   4 Sheets-Sheet 3

Inventor:
Stanley H. Hobson
By Wilson & McGuinn
Attys.

Feb. 18, 1930.  S. H. HOBSON  1,747,242
ELECTRIC STOVE
Filed Aug. 8, 1924   4 Sheets-Sheet 4

Patented Feb. 18, 1930

1,747,242

UNITED STATES PATENT OFFICE

STANLEY H. HOBSON, OF ROCKFORD, ILLINOIS, ASSIGNOR TO GEO. D. ROPER CORPORATION, OF ROCKFORD, ILLINOIS, A CORPORATION OF ILLINOIS

ELECTRIC STOVE

Application filed August 8, 1924. Serial No. 730,935.

This invention relates in general to electric heaters and, more particularly, to electric stoves employing hot plate heaters for cooking purposes.

The primary object of my invention is to provide an improved electric stove which shall be more efficient for cooking purposes than prior constructions. To this end I have provided a hot plate electric stove characterized by a novel form of heating element on which a vessel or utensil may be supported and heated entirely by conduction as distinguished from certain types of prior electric stoves which heat to a greater or lesser degree by radiation and convection. I have also aimed to provide an electric stove of this kind which shall be practical, durable, economical to operate and adapted for manufacture at a comparatively low cost.

In furtherance of the foregoing I have provided an embedded resistor type of electric heating element, one or more of which make up a cooking top. The heating element is so constructed and supported that it is an especially good thermal conductor and will produce a comparatively quick heat desirable for cooking. In the preferred embodiment of my invention the heating element or unit is circular so as to best accommodate the shape of the average cooking vessel or utensil without leaving exposed areas or corners as in the square type of heaters which allow heat loss. The resistance conductor is embedded and thereby protected from mechanical injury, foreign matter and electrolytic action; consequently it is more desirable than the exposed resistor type of heating elements which heat by radiation and convection and which by reason of their bare resistance wires, generally in the form of coils, are openly subjected to injury and short-circuiting. My electric cooking top comprises but few parts and electrical connections and at the same time includes in the preferred embodiment a plurality of electric heating units which are readily replaceable and may be easily assembled in a supporting structure. The electric heating elements are in the preferred embodiment nested one within another in concentric relation so that the tops of the elements make up a comparatively broad, flat, vessel-supporting surface or cooking top and so that they may be energized to produce different heats suitable for cooking requirements. By reason of this concentric relation, vessels or utensils of comparatively small size approximating the diameter of the innermost element will be heated very efficiently. With a construction of this kind there is no heat loss as occurs in the solid or single piece type of hot plate the entire top of which is heated at any and all heats.

I have, more particularly, provided an electric stove or cooking top unit comprising a thin sheet metal sheath shaped to provide a flat, circular vessel-supporting top and a shallow enclosure therebelow, a body of electrical insulating and heat conducting material compacted within said enclosure in contact with its walls, and an electric resistor embedded in said material. An electric cooking top of this kind has considerably higher efficiency than prior electric stoves now on the market, and may be used very satisfactorily and economically with low wattages as is desired especially in domestic cooking.

I have also aimed to provide improved means for supporting ring heating elements of the character described in a cooking top with the view to securing increased efficiency in heaters of this kind.

Other objects and attendant advantages will be appreciated by those skilled in this art as the invention becomes better understood by reference to the following description when considered in connection with the accompanying drawings, in which—

Figure 1, is a half section of an electric stove in perspective, embodying my invention;

Fig. 2 is a detail section taken on the line 2—2 of Fig. 1;

Fig. 3, is a perspective view of a stove embodying my invention;

Fig. 4, is a top fragmentary view of a modified form of electric stove embodying my invention;

Figure 7:
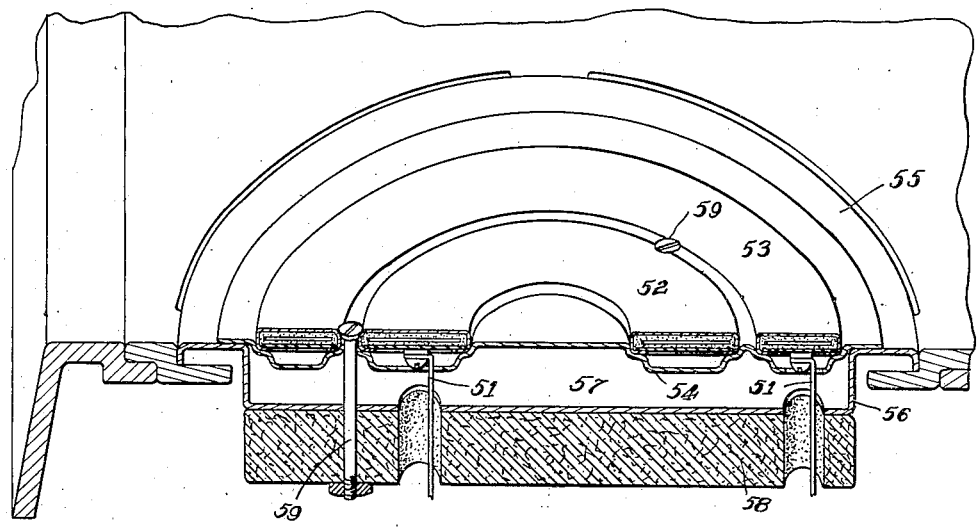
Figure 8:
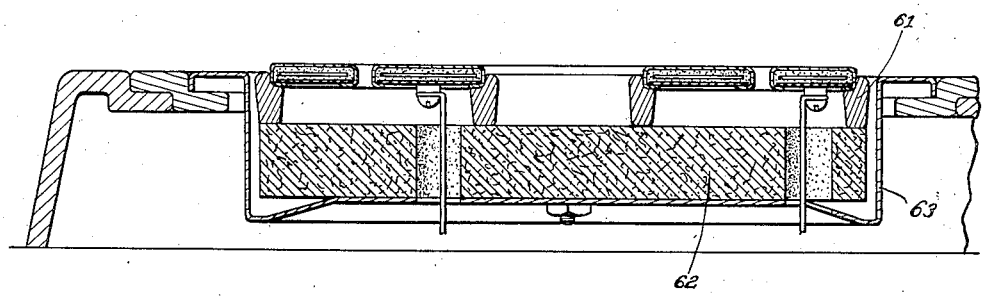
Figure 9:
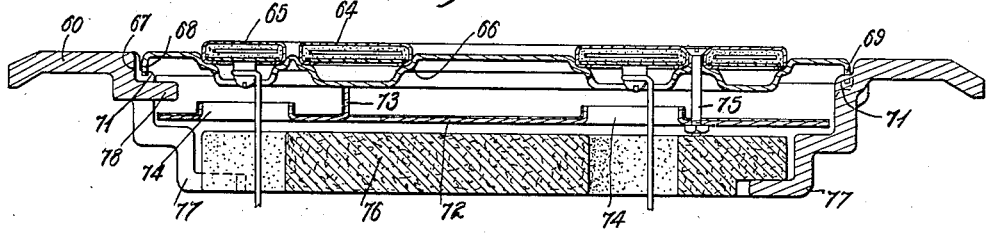
Figure 10:
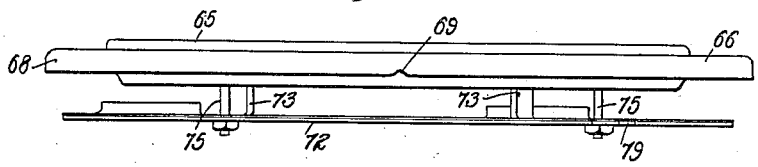
Figure 11:
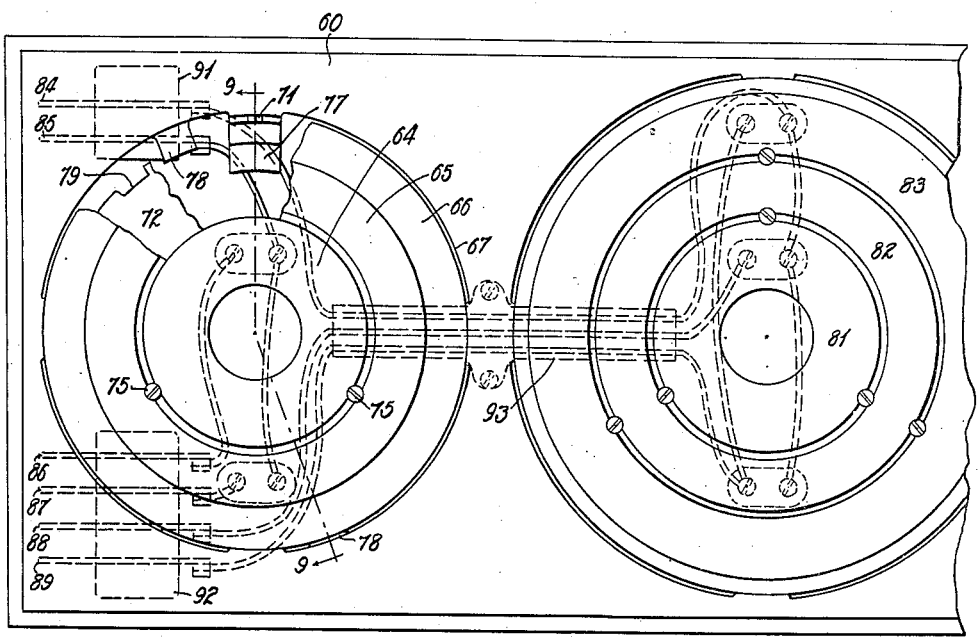

Figs. 5 and 6, are sections taken on the lines 5—5 and 6—6, respectively, of Fig. 4;

Figs. 7 and 8, are sections, the former in perspective, of modified forms of electric stoves embodying my invention;

Fig. 9 is a vertical section through still another modified form of electric stove embodying my invention;

Fig. 10 is a side view of the ring heater unit shown in Fig. 9, removed from the top plate; and Fig. 11, is a top view partly broken away of a top plate embodying two ring heater units of the kind shown in Fig. 10.

My invention is shown in a simple form in Figs. 1, 2 and 3, from which it will be observed that the cooking top of the stove or range comprises the top frame 15, one or more top plates 16 removably supported on said frame, and one or more electric heater units supported on each top plate. Each top plate has a circular opening 17 for the reception of each heating unit; and inasmuch as the construction and mounting of these units are similar a description of one will suffice.

The ring heater unit shown in Fig. 1 comprises a plurality (two in this instance) of electric heater elements designated generally by 18 and 19 respectively. In a cooking top such as shown in Fig. 3 it is desirable to employ a three ring unit 20 in addition to the two ring units in order to take care of higher heat requirements. Each ring heating element in the preferred embodiment of my invention is made up of a metal sheath having an upper and a lower flat wall 21 and 22 joined by inner and outer circular walls 23 and 24, these walls providing a shallow, flat enclosure or casing in ring form. This sheath may be constructed in any suitable manner of metal having good wearing and heat conducting properties and is at present made up of two parts, one a sheet metal lower wall 22 and the other a single piece of sheet metal forming the top wall 21 and side walls 23 and 24, the latter of which are turned or flanged over the marginal edges of the bottom wall 22. Within this sheath a resistance conductor 25, known as a resistor, is embedded in a body of electrical insulating and heat conducting material 26 preferably under heavy compression. This material may be an aluminum oxide with a suitable binder such as clay. The unit will be heated to vitrify the embedding material so that excellent thermal contact is established between the resistor, its supporting and insulating body and the ring sheath at the different working temperatures for which the ring element is designed. By reason of this construction the entire unit is adapted to be brought to a red heat. The resistor is preferably in the form of a ribbon arranged in zig-zag fashion as shown in Fig. 1, to distribute heat substantially uniformly throughout the entire area of the ring element. Because of the shallow, flat, compacted construction this heating element will produce a rapid heat with comparatively low wattage. The top wall 21 of the ring heating element provides a broad, flat, vessel-supporting surface of maximum area for a given size unit so that the average cooking vessel or utensil resting thereon is directly and very efficiently heated by conduction. Suitable electrical connections may be provided for the resistance element, it being noted in Fig. 2 that the current supplying wires 27 are attached to the resistor terminals by suitable screw connectors 28 through the bottom wall of the sheath.

The ring heating elements or units 18 and 19 are nested one within the other in concentric relation and supported with their vessel-supporting surfaces 21 in a common plane above the surrounding frame or supporting structure so that a vessel seated on said ring elements will not lose any of its heat by contact with said structure. Said ring elements are also supported in such manner that there is no concentration of heat at their sides which because of the thinness of the elements would be destructive thereto. In the preferred embodiment of my invention the undersides of the ring elements are open and the supporting means therefor allows a limited radiation of heat. In the present example I provide a ring element support consisting of a sheet metal disc designated generally by 29 shaped as by a stamping operation to provide concentric annular seats 31 for the marginal edges of the rings, a ring separating flange 32, annular channels 33 providing an air space 34 beneath each ring, and a marginal supporting flange 35. The flange 35 rests on a plurality of circumferentially spaced lugs 36 integral with the top plate 16. The opening 17 in said top plate provides an air space entirely around the ring support 29 except at the short intervals at which said support rests on the lugs 36, thereby providing an effective heat insulation between said ring support and the top plate. The ring elements may be detachably secured to the supporting disc 29 by any suitable means such for example as bolts 37 the heads of which are received below the top surface of the ring elements by depressions in the latter.

In Figs. 4 and 5 I have shown a modified form of my invention in which inner and outer ring elements 38 and 39, similar to those described above, are supported on a cast metal ring designated generally by 41 having inner and outer annular body portions 42 and 43 providing annular seats for the inner and outer rings respectively and having radial ribs 44 joining the body portions 42 and 43 providing support for both ring elements. A support of this character provides air spaces 45 beneath the ring elements for the purpose described above. In order to prevent loss of heat by downward radiation from said elements and by conduction from the ring support 41, I position below the latter a base block 40 of suitable non-heat conducting or refractory material. In this instance the ring support 41 is mounted directly upon said base block and the ring elements are secured to the support 41 by bolts 46 similar to the bolts 37 above described which pass down through the insulation block 40. This provides a unit assembly corresponding to that comprising the ring elements and supporting disc 29 above described. This unit assembly is suitably supported as by lugs 47 in an opening 48 in a top plate 49, said opening 48 providing an air insulation around the ring heater unit. In this case the current supply wires 51 extend down through the base block 40 as shown.

In Figs. 7 and 8 I have shown additional modifications of my invention. Fig. 7 shows ring elements 52 and 53 seated on a sheet metal disc support 54 the marginal flange of which is supported on a circular casing member designated generally by 55. This casing member in turn is removably supported on lugs in an opening in the top plate as described above with reference to the ring support 29, and has a depressed center 56 providing a confined air space 57 beneath the ring heaters. To the under side of the depressed portion 56 is attached a base block 58 of refractory heat resisting material for preventing loss of heat by downward radiation from said casing. All of the parts 52, 53, 54, 56 and 58 are secured together in a unit assembly by bolts 59. Fig. 8 shows a somewhat similar unit assembly except that a cast iron ring support 61 is used in place of the sheet metal support 54 and the heat resisting base block 62 is supported on top of the depressed casing portion 63 instead of beneath it.

Still another embodiment of my invention is shown in Figs. 9, 10 and 11, the latter showing a top plate 60 which carries two electric stoves of two ring elements and three ring elements, respectively. Said electric stoves being identical in construction a description of one will suffice. Referring to the stove unit shown at the left, Fig. 11, it comprises a pair of ring heater elements 64 and 65 seated on a sheet metal disc 66 providing support for said ring elements as described above with respect to Fig. 1. Said support 66 is positioned in a circular opening 67 in the top plate and its marginal flange 68 is notched on the under side at circumferentially spaced points as at 69 for location and support on complemental bosses 71 on the top plate. A circumferential air space is thus provided around the support 66 and contact thereof with the top plate is reduced to an almost negligible degree so far as being a source of heat loss is concerned. Spaced beneath the ring element support 66 I provide a disc reflector plate 72 of sheet metal having punched up lugs 73 for spacing purposes and openings 74 for the extension therethrough of the current supply wires of the ring elements. Suitable bolts 75 secure the ring elements 64 and 65, the support 66 and the reflector plate together into a unit assembly. The top of said plate 72 is preferably glazed as by a baked enamel finish, or may be otherwise finished to provide a reflector surface for reflecting upwardly heat radiated from the ring unit. Immediately below the reflector plate is provided a base block 76 of suitable heat resisting material, this block being at present supported on lugs 77 depending from the top plate. In order to prevent upward displacement of the unit just described I have provided a plurality of lugs 78 projecting inwardly from the top plate and overreaching the reflector plate, and have notched the marginal edge of the latter as at 79 so that by a slight rotative movement after withdrawing the support 66 from the lugs 71 said notches 79 may be brought into alignment with the lugs 78 and the unit assembly may be withdrawn from the top plate. The reflector plate functions to prevent loss of heat by downward radiation and convection. It also serves as a protective covering for preventing spilled liquids from injuring the base block 76. This is desirable especially when employing a base block of heat resisting material such as non-pareil which I find very practical and satisfactory as a factor in promoting comparatively high efficiency in the combination disclosed herein. The electric stove unit comprising three ring heating elements 81, 82 and 83 shown at the right in Fig. 11 is except for the number of heating elements the same as its companion stove unit just described.

I prefer to employ a single resistor in each ring heating element and a plurality of such elements in concentric relation for a single stove unit, and to optionally energize the elements in series for a low heat, in parallel for a high heat and one of the elements alone for medium. This wiring is not, however, essential for the reason that more than one resistor winding might be employed in a single element for producing different heats. The preferred construction is particularly well suited for commercial purposes and I have devised a simple and practical arrangement of connections as shown in Fig. 11. From this it will be seen that terminal connectors 84 to 89 inclusive mounted on insulation blocks 91 and 92 attached to the underside of the top plate 60 at the rear end thereof, are connected by suitable lead wires to the respective resistor terminals, the wires for the three ring unit being confined in a conduit 93 centrally attached to the underside of the top plate. The connectors 84 to 89 inclusive are adapted to make contact with complemental connectors on the stove frame when the top plate is placed in operative position thereon. Suitable control switches may be provided for connecting the heating elements to effect the different heats. For example by connecting the terminals 86 and 87 the ring elements 64 and 65 will be connected in series, producing a low heat. Terminals 86 and 87 connected with 85 will energize the ring elements in parallel, producing a high heat. By connnecting 85 and 86 the inner ring element 64 will be energized alone, producing the medium heat. The three ring stove unit may be controlled in a similar manner except that both the high and medium heats are produced by connecting three and two ring elements, respectively, in parallel.

It is believed that the foregoing conveys a clear understanding of the objects prefaced above. It should be noted however that my invention in its broadest sense comprehends the use of a single heating element of the character described constituting an electric stove and that the heating element should not be confined to a ring but should be circular. In view of the foregoing and of the modifications disclosed it will be manifest that in putting my invention into practice many changes might be made without departing from its spirit and scope as expressed in the appended claims, in which—

I claim:

1. In an electric stove, in combination, a plurality of ring heating elements, and a sheet metal disc providing concentric seats on which the marginal portions of the ring elements are supported and intermediate channels providing air spaces beneath the ring elements.

2. In an electric stove, in combination, a plurality of ring heating elements, a sheet metal disc providing concentric seats on which the marginal portions of the ring elements are supported and intermediate air spaces beneath the ring elements, and a base of heat resisting material beneath the ring-supporting disc.

3. In an electric stove, in combination, a plurality of ring heating elements, a sheet metal disc providing concentric seats on which the marginal portions of the ring elements are supported and intermediate air spaces beneath the ring elements, a base of heat resisting material beneath the ring-supporting disc, and a reflector plate interposed between said base and disc for reflecting heat upwardly.

4. In an electric stove in combination, a ring heating element, and a sheet metal disc providing concentric seats on which the inner and outer edges of said ring element are supported, and an intermediate channel providing an air space beneath the ring element.

5. In an electric stove in combination, a ring heating element, a sheet metal disc providing concentric seats on which the inner and outer edges of said ring element are supported, and an intermediate channel providing an air space beneath the ring element, and a base of heat resisting material beneath said disc.

6. In an electric stove in combination, a ring heating element, a sheet metal disc providing concentric seats on which the inner and outer edges of said ring element are supported, and an intermediate channel providing an air space beneath the ring element, a base of heat resisting material beneath said disc, and a reflector plate interposed between said base and disc for reflecting heat upwardly.

7. In an electric stove in combination, a plurality of ring heating elements, a sheet metal disc formed to provide on the upper face thereof a plurality of concentric seats on which the marginal portions of the ring elements are supported in concentric relation, said disc having depressed annular portions so as to provide on the top surface thereof channels intermediate the concentric seats providing air spaces beneath the ring elements, there being a space left between the outer marginal edge of one ring element and the inner marginal edge of the next ring element, bolts passed through holes in said disc between the ring elements having the heads thereof engaging the edges of said elements for holding the same on their seats, and a reflector plate beneath the disc for reflecting heat upwardly, said plate having means for holding the same spaced from the disc and having the aforesaid bolts entered therethrough for securing the plate to the disc as a unit.

8. A structure as set forth in claim 7, wherein the reflector plate is made of sheet metal and wherein the means for holding said plate spaced from the disc comprises lugs struck upwardly from said disc at a plurality of points for engaging the bottom of the disc.

9. A device of the character described, comprising in combination, a top plate having a circular opening provided therein for reception of an electric stove, an electric stove fitting in said opening and comprising one or more ring heating elements, and a sheet metal disc providing concentric seats on which the marginal portions of the ring elements are supported, and intermediate channels providing air spaces beneath the ring elements, the outer marginal edge of said disc being provided with a downturned annular flange, the same having notches provided in the lower edge thereof at predetermined points, and said top plate having a plurality of bosses projecting inwardly from the sides of the opening therein correspondingly spaced for reception in said notches, whereby rigidly to support the stove in the opening in the top plate with the minimum of contact between the disc and the top plate and so as to leave a circumferential air space between the outer edges of the disc and the top plate to minimize loss of heat from the stove to the top plate.

10. A device as set forth in claim 9, including a reflector plate disposed underneath the disc and secured thereto in fixed spaced relation, said plate serving in normal operation to reflect heat upwardly, and including a plurality of inwardly projecting lugs provided on the top plate projecting between the outer edges of the disc and plate for preventing upward displacement of the stove unit from the opening in the top plate, the said plate having a plurality of notches provided in the outer edge thereof arranged when the stove is raised off its supporting bosses and turned slightly to come into register with said lugs, whereby to permit the reflector plate to pass the lugs in the removal of the stove.

11. A device as set forth in claim 9, including a reflector plate disposed underneath the disc and secured thereto in fixed spaced relation therewith for removal therewith from the top plate as a unit, and a base of heat resisting material disposed beneath the reflector plate and supported from the top plate.

STANLEY H. HOBSON.